United States Patent
Tucker

(10) Patent No.: US 7,434,210 B1
(45) Date of Patent: Oct. 7, 2008

(54) INTERPOSING LIBRARY FOR PAGE SIZE DEPENDENCY CHECKING

(75) Inventor: Andrew G. Tucker, Menlo Park, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 918 days.

(21) Appl. No.: 10/791,023

(22) Filed: Mar. 2, 2004

(51) Int. Cl.
G06F 9/45 (2006.01)
G06F 9/455 (2006.01)
G06F 9/46 (2006.01)

(52) U.S. Cl. .................. 717/138; 717/151; 703/23; 703/26; 718/106

(58) Field of Classification Search ......... 717/106–108, 717/114–118, 138, 151–161; 703/26, 27; 718/100, 102, 106

See application file for complete search history.

(56) References Cited

U.S. PATENT DOCUMENTS

| | | | | |
|---|---|---|---|---|
| 4,885,681 A * | 12/1989 | Umeno et al. | ................... | 718/1 |
| 5,815,686 A * | 9/1998 | Earl et al. | ...................... | 703/26 |
| 5,835,964 A * | 11/1998 | Draves et al. | .............. | 711/207 |
| 5,899,994 A * | 5/1999 | Mohamed et al. | ........... | 707/100 |
| 5,949,985 A * | 9/1999 | Dahl et al. | .................... | 703/26 |
| 6,247,105 B1 * | 6/2001 | Goldstein et al. | ........... | 711/170 |
| 6,430,670 B1 * | 8/2002 | Bryg et al. | .................. | 711/216 |
| 6,446,094 B1 * | 9/2002 | Egolf et al. | ................. | 707/206 |
| 6,480,845 B1 * | 11/2002 | Egolf et al. | ..................... | 707/6 |
| 6,542,978 B2 * | 4/2003 | Goldstein et al. | ........... | 711/170 |
| 6,605,120 B1 * | 8/2003 | Fields et al. | ................. | 715/513 |
| 6,675,218 B1 * | 1/2004 | Mahler et al. | ............... | 709/230 |
| 6,718,538 B1 * | 4/2004 | Mathiske | ..................... | 717/129 |
| 6,760,815 B1 * | 7/2004 | Traversat et al. | ............ | 711/135 |
| 6,763,328 B1 * | 7/2004 | Egolf et al. | ................... | 703/27 |
| 6,895,491 B2 * | 5/2005 | Kjos et al. | ................... | 711/203 |
| 6,959,441 B2 * | 10/2005 | Moore | ........................ | 719/328 |
| 7,130,786 B2 * | 10/2006 | Grebenev | ..................... | 703/22 |
| 2003/0088807 A1 * | 5/2003 | Mathiske et al. | ............... | 714/6 |

OTHER PUBLICATIONS

Talluri et al., "Surpassing the TLB Performance of Superpages with Less Operating System Support," Dec. 1994, ACM, p. 171-182.*
Alexandrov et al., "UFO: A Personal Global File System Based on User-Level Extensions to the Operating System," Aug. 1998, ACM, p. 207-233.*
Jacob et al., "A Look at Several Memory Management Units, TLB-Refill Mechanisms, and Page Table Organizations," Nov. 1998, ACM, p. 295-306.*

* cited by examiner

Primary Examiner—Wei Y. Zhen
Assistant Examiner—Qing Chen
(74) Attorney, Agent, or Firm—Osha Liang LLP

(57) ABSTRACT

A method for checking page size dependency including generating an interposing library comprising a first modified interface, wherein the first modified interface is dependent on a native page size, intercepting a call into a kernel by the interposing library, wherein the call is dependent on a non-native page size, modifying the call using the first modified interface to obtain a modified call, and generating a response to the modified call by the kernel using the native page size.

6 Claims, 4 Drawing Sheets

INTERPOSING LIBRARY FOR PAGE SIZE DEPENDENCY CHECKING

BACKGROUND

Operating systems typically include functionality to manage and use system memory. This functionality is typically, provided by a kernel. The kernel provides one or more of the following functions to allow user-level and kernel-level applications to use and manage system memory: functions to allocate memory, functions to map memory, functions to profile application memory usage, etc. In addition, operating systems typically employ memory management schemes that use software to extend the capabilities of the physical hardware. Specifically, software is used to provide a bridge between real memory (i.e., the physical memory) and virtual memory (i.e., memory that user-level and kernel-level applications manipulate). Software is typically necessary to bridge the gap between real memory and virtual memory because typically the address space used by user-level and kernel-level applications does not correspond one-to-one with real memory.

Conventionally, in order to translate a virtual memory address into a physical address, the operating system uses a mapping between the physical and virtual address. The mapping is generally stored in a translation look-aside buffer (TLB) associated with a processor upon which the operating system is executing. The mappings between the physical memory and the virtual memory are stored as a series of entries, where each entry in the TLB represents a single page of virtual memory mapped to physical memory. The page corresponds to a unit of virtual memory. As the amount of physical memory and, as a consequence, virtual memory increases, the page size becomes an important factor with respect to system performance. Specifically, because the total amount of virtual memory that can be mapped/entered into the TLB is dependent on the page size, if the page size increases, then the TLB coverage (i.e., memory mapped within a given TLB) can grow proportionally. This increase in page size typically results in a performance increase for user-level and kernel-level applications that have intensive memory requirements.

When the page size used by a particular operating system has remained constant for an extended period of time, user-level and kernel-level applications may accumulate dependencies (both implicit and explicit) on the page size. Such dependencies are typically difficult to detect using static analysis (i.e., looking for use of problematic interfaces). Further, the dependency per application is often subtle and difficult to find. If developers change the default page size for the entire system by modifying the kernel, the applications that have dependencies on page size often cease to function correctly. Accordingly, various techniques have been developed to determine the existence of a page size dependency.

One such technique is to provide a "knob" or tunable device that changes the system page size in the kernel, allowing a developer to test for problematic applications while still preserving the default behavior. This technique is typically implemented by modifying the kernel to support alternate page sizes. Once the page size has been modified, the user may then proceed to test all user-level and kernel-level applications individually and, thereby, determine the particular user-level and kernel level applications having page size dependencies. Once these applications have been identified, the applications may be modified to remove the page size dependencies.

SUMMARY

In general, in one aspect, the invention relates to a method for checking page size dependency comprising generating an interposing library comprising a first modified interface, wherein the first modified interface is dependent on a native page size, intercepting a call into a kernel by the interposing library, wherein the call is dependent on a non-native page size, modifying the call using the first modified interface to obtain a modified call, and generating a response to the modified call by the kernel using the native page size.

In general, in one aspect, the invention relates to a system for checking page size dependency comprising a kernel using a native page size, a user-level application, and an interposing library configured to emulate a non-native page size to the user-level application, wherein the interposing library emulates the non-native page size by modifying results from the kernel based on the non-native page size.

In general, in one aspect, the invention relates to a computer system for checking page size dependency, comprising a processor, a memory, a storage device, a computer display, and software instructions stored in the memory for enabling the computer system under control of the processor, to generate an interposing library comprising a first modified interface, wherein the first modified interface is dependent on a native page size, intercept a call into a kernel by the interposing library, wherein the call is dependent on a non-native page size, modify the call using the first modified interface to obtain a modified call, and generate a response to the modified call by the kernel using the native page size.

In general, in one aspect, the invention relates to a network system having a plurality of nodes, comprising a kernel using a native page size, a user-level application, and an interposing library configured to emulate a non-native page size to the user-level application, wherein the interposing library emulates the non-native page size by modifying results from the kernel based on the non-native page size, wherein the kernel executes on any node of the plurality of nodes, wherein the user-level application executes on any node of the plurality of nodes, wherein the interposing library executes on any node of the plurality of nodes.

Other aspects of the invention will be apparent from the following description and the appended claims.

DETAILED DESCRIPTION

Figure 1:
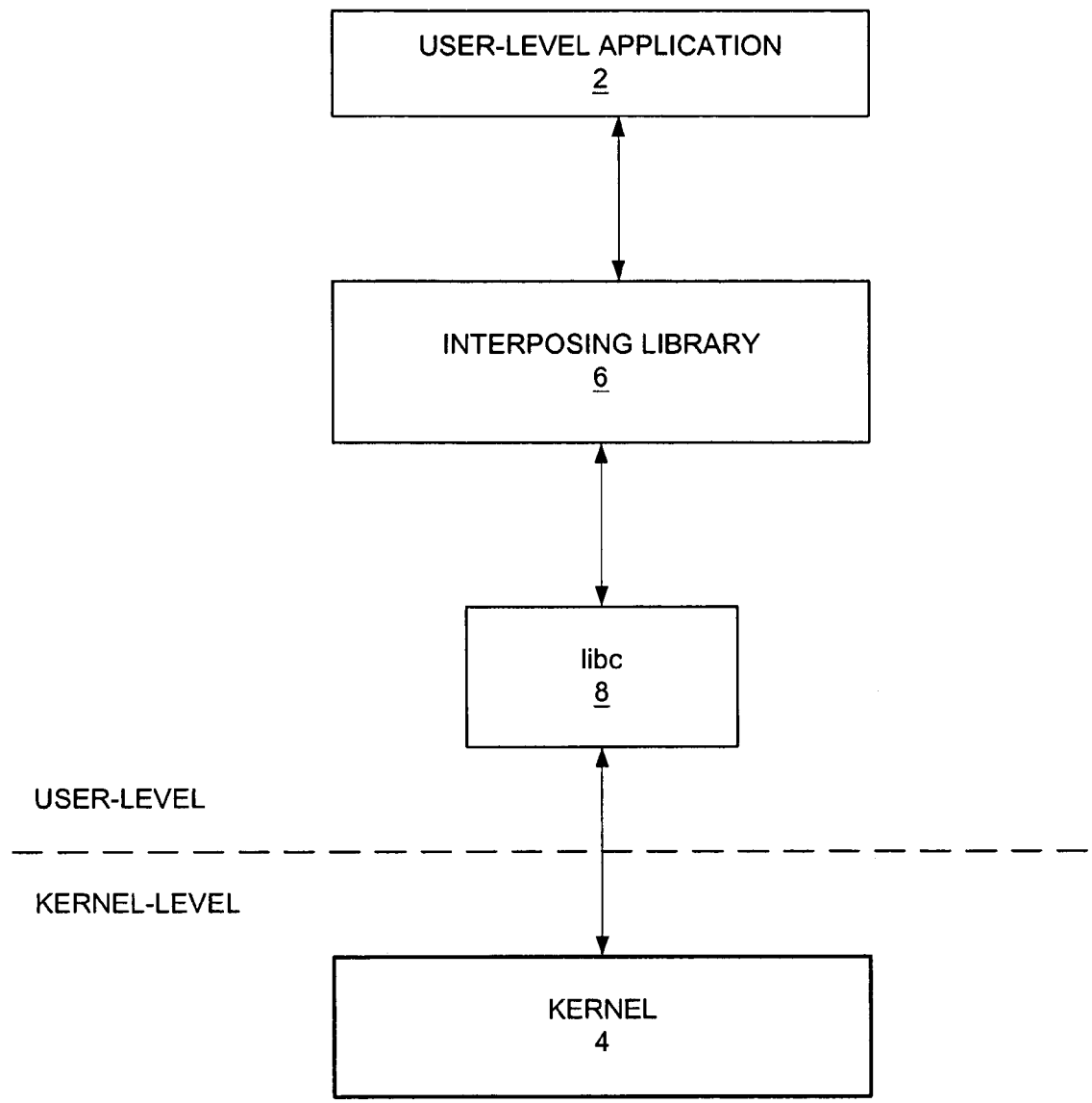
FIG. 1 illustrates a flow diagram in accordance with one embodiment of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid obscuring the invention.

Generally, one or more embodiments of the invention provide a means to emulate a new page size to a user-level application using a mechanism that does not require modification to the native page size. More specifically, one or more embodiments of the invention relate to a method and apparatus for providing an interposing library that interposes on interactions between a user-level application and a kernel for the purposes of determining applications with page size dependencies. In addition, embodiments of the invention provide an interposing library that modifies arguments that request or provide information associated with the page size and are passed by the user-level application to the kernel. Further, embodiments of the invention provide an interposing library that includes functionality to interpose system calls that map, unmap, and change the protection of pages in the address space of user-level application.

FIG. 1 illustrates a flow diagram of the interaction between a user-level application (2) and a kernel (4) in accordance with one embodiment of the invention. The user-level application (2) typically includes functionality to call into the kernel (4) and to receive responses to the calls from the kernel (4). Similarly, the kernel (4) typically includes functionality to receive calls from the user-level application (2) and to provide a response to each call or series of calls. Calls from the user-level application (2) to the kernel (4) and vise versa are typically passed through a standard C program library known as libc (8). libc (8) receives calls from the user-level application, modifies the calls as necessary, and forwards the calls to the kernel (4). In addition, an interposing library (6) may also be present in the system.

In one embodiment of the invention, an interposing library (6) is provided to intercepts calls into the kernel (4) that depend on page size. Further, the interposing library (6) may also intercept calls returning from the kernel (4). As such, the interposing library (6) is typically located between the user-level application (2) and libc (8). The interposing library (6) typically only intercepts calls returning from the kernel that corresponds to intercepted calls into the kernel. Further, the interposing library (6) typically includes functionality to determine which of the intercept calls to modify and how to modify the intercepted calls.

The interposing library (6) masks interactions between the user-level application (2) and the kernel (4) by providing the illusion that the user-level application (2) is executing on a system with an alternate (i.e., larger or smaller page size than native) page size, while concurrently executing all the calls on the native page size. Thus, the interposing library (6) does not change the native page size programmed into the kernel of the system; rather the interposing library (6) emulates an alternate page size used by the user-level application (2). If a user-level application (2) ceases to function correctly (as a result of the interposing library modifying the interface with an alternate page size), then that particular user-level application is said to have a page size dependency. In this manner, interfaces with inherent page size dependencies can be determined efficiently and effectively. The interposing library (6) may be used, for example, in a test bench to determine which interfaces depend on the native page size of a system.

As noted above, the interposing library (6) includes functionality to intercept and modify calls into the kernel (4) and functionality to intercept and modify calls returning from the kernel (4). However, the interposing library (6) does not typically intercept and modify all calls into and returning from the kernel (4); rather, the interposing library only intercepts calls that are dependent on page size. Calls are typically said to be dependent on page size if the call explicitly uses page size in the interface (i.e., set of arguments passed with the call), or requires knowledge of the page size to generate a result.

Accordingly, in one embodiment of the invention, the list of calls that the interposing library (6) intercepts and modifies is obtained by inventorying the operating system and determining which calls depend on page size. In one embodiment of the invention, inventorying and determining which calls depend on page size may be performed by examining the interfaces, and more specifically, the arguments included with the call. In one embodiment of the invention, once the call with page size dependencies are identified, the calls, and more particularly the interfaces associated with the calls, are stored in the interposing library (6) such that every call that is dependent on page size is intercepted.

In addition to storing the calls with page size dependencies, the interposing library includes modified versions of the calls. More specifically, the interposing library includes modified versions of the interfaces associated with the call. Thus, for example, if the user-level application requests the address of a particular page, the interposing library intercepts this call and replaces the call with a modified version of the call. The modified version of the call is then forwarded to the kernel where the call is processed. One skilled in the art will appreciate that the interposing library operates in the same manner described above for calls returning from the kernel.

In one embodiment of the invention, the interface for a call into the kernel and the interface for the corresponding call out of the kernel are both intercepted and modified by the interposing library. Those skilled in the art will appreciate that a call into the kernel may include a call into libc (or an equivalent library). Alternatively, if the call into the kernel (e.g., via a call into libc) does not affect the state of the system (e.g., the call into the kernel is a request for information), then the call into the kernel may be intercepted and the response generated by the interposing library and returned to the calling user-level application. Thus, if the user-level application requests the page size, via a call into the kernel, the interposing library may intercept the call and return the page size the to user-level application instead of forwarding a modified call to the kernel and intercepting the response to the call from the kernel. As another alternative, the interposing library may not modify calls into the kernel and only modify the corresponding calls out of the kernel.

Typically, the interposing library and libc are linked with the user-level application by a runtime linker. The runtime linker determines how control is transferred when a given interface is called by the user-level application. The linking allows for interpositioning. Thus, a given interface in libc may be interposed by implementing an interface in the interposing library with the same name as an interface in libc. The interface in the interposing library is subsequently preloaded. Thus, when the user-level application calls an interface in libc, control is transferred to the corresponding interface in the interposing library. The interface in the interposing library, modifies the arguments, and then forwards the call to the corresponding interface in libc.

Figure 2:
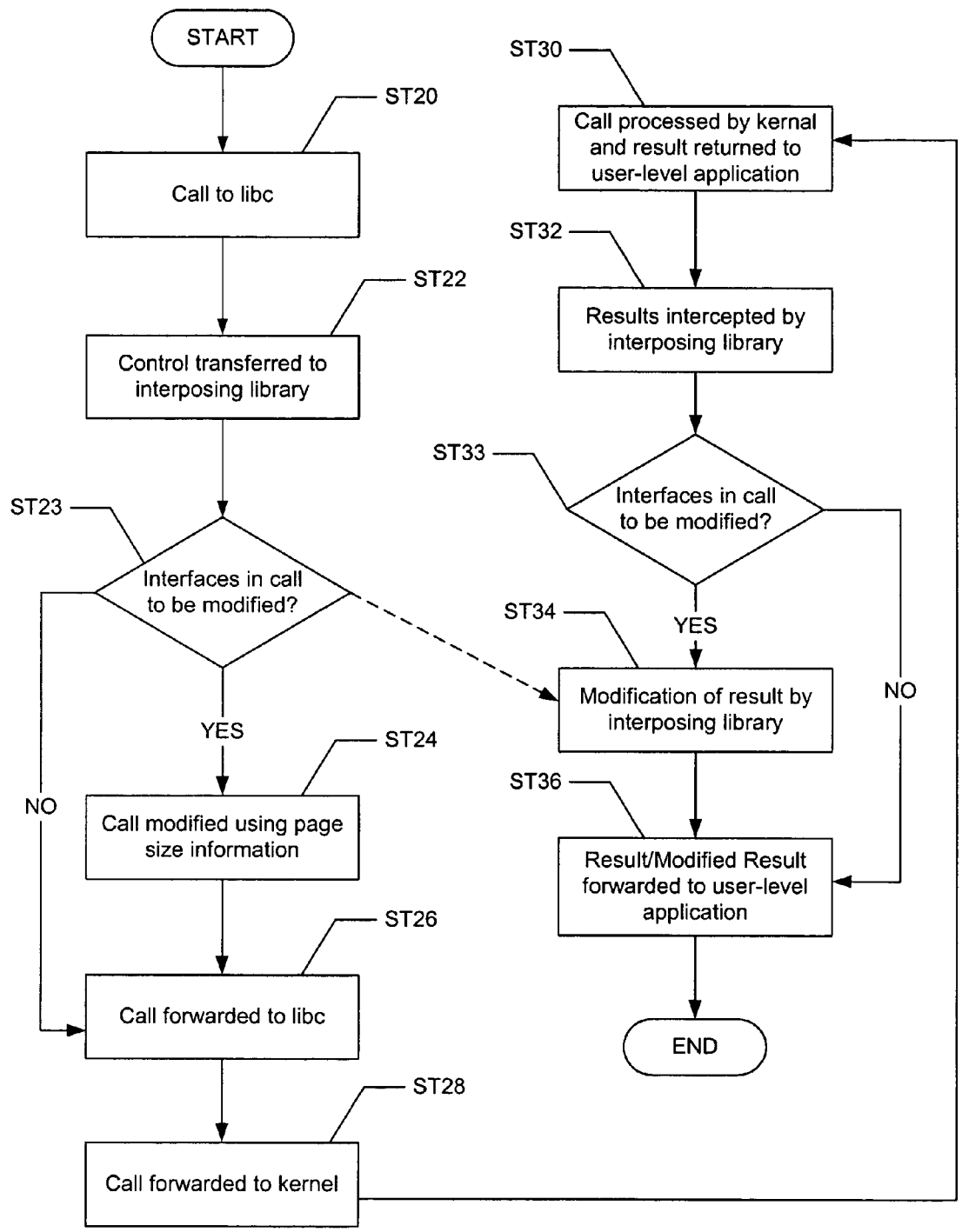
FIG. 2 illustrates a flow chart in accordance with one embodiment of the invention.

FIG. 2 illustrates a flow chart of a method for using an interposing library in accordance with one embodiment of the invention. Prior to performing the method illustrated in FIG. 2, the non-native page size to emulate is typically set by the user (or a process controlled by the user). The interfaces within the interposing library are also modified, as necessary, in accordance with the page size. Once the aforementioned steps have been completed, the interposing library is linked with user-level application and libc by the runtime linker. As a result, the system executing the user-level application and interposing library are ready to perform the following method.

Initially, a user-level application calls into libc for a particular interface (Step 20). Control is subsequently transferred to an interposing library (Step 22). The interposing library is then queried to determine whether the interface associated with the particular call is to be modified (Step 23). If the interposing library indicates that the interface associated with the call into libc needs to be modified, then the interface is modified (Step 24). The modified call is subsequently forwarded to libc (Step 26), which then forwards the call to the kernel (Step 28). As noted above, the interposing library may include different versions of the interface that may be substituted with the current interface of the call. The different versions of the interface typically include modified arguments. In particular, the arguments are modified such that the call into libc, which used a non-native page size, is converted into a call that uses the native page size.

Continuing with the discussion of FIG. 2, if the interfaces associated with the call do not need to be modified, then the call is simply passed through to libc (Step 26), which subsequently forwards the call to the kernel (Step 28). The kernel subsequently processes the call or modified call. At this stage, the kernel processes the call based on the native page size.

Once the result has been generated by the kernel, the result is returned to the user-level application (Step 30). The result is subsequently intercepted by the interposing library (Step 32). Similar to the call into the kernel, the interposing library is queried to determine whether the interface associated with the return call is to be modified (Step 33). If the interposing library indicates that the interface associated with the return call needs to be modified, then the interface is modified (Step 34). The interposing library typically modifies the result to provide a result to the user-level application that is consistent with the result expected using a non-native page size. For example, if the user-level application has requested the allocation of 100K memory and the native page size was 4K (i.e., requiring 25 pages to be allocated), and the non-native page size emulated by the system was 8K (i.e., requiring 13 pages to be allocated), then the interposing library would request that the kernel allocate 104K of memory and modify the result to indicate to the user-level application that 13 pages (i.e., 104K) were allocated as opposed to the 26 pages the kernel actually allocated.

Continuing with FIG. 2, the result or modified result is subsequently forwarded to the user-level application (Step 36). Note that if the interface associated with the return call does not need to be modified, then the return call is simply passed through the interposing library and forwarded to the user-level application (Step 36). As noted above, one skilled in the art will appreciate that interfaces that do not depend on page size do not need to be modified and can be directly passed through to the kernel via libc.

As noted above, the interposing library is queried to determine whether the interface associated with the particular call is to be modified (Step 23). In some cases, the interfaces may be modified and forwarded to the kernel; however, in one embodiment of the invention, if the call into libc does not affect the state of the system (as described above), then the interposing library may generate a result based on the non-native page size and forward the result to the user-level application without needing to forward the call to the kernel.

Those skilled in the art will appreciate that while the aforementioned method describes a user-level application calling into libc, and libc subsequently forwarding the call to the kernel, the invention may be implemented on a system in which a user-level application calls into the kernel without necessitating an initial call into libc.

The following examples illustrate various implementations of the invention. These examples are intended only to show one or more of the aforementioned embodiments are is not intended to limit the scope of the invention.

In a first example, consider the request from a user-level application to obtain the page size. This call has a direct (i.e., explicit) dependency on the page size of the system. Thus, when the user-level application calls into the kernel (e.g., via libc) to obtain the page size, the interposing library may intercept the request and, rather than forward the request to the kernel, generate a response (i.e., a return call that includes the non-native page size) and forward the response to the user-level application.

In a second example, consider a typical interface that has an implicit dependency on the page size, for example, an interface that maps a section of memory. In this example, the section of memory that is mapped depends on the native page size because the size of the section of memory is typically a multiple of the native page size. For example, if the native page size is 4K and the section of memory to be mapped is 100K, then the kernel allocates 25 pages. However, if the non-native page size emulated by the interposing library is 8K, then the interposing library requests that 104K of memory is mapped and intercepts the return call from the kernel and modify the arguments of the interface to include an alternate page size that is greater than and a multiple of the native page size, e.g., 8K. In this manner, the user-level application receives a mapping of a section of memory that is 13 pages (i.e., 104K of memory). One skilled in the art will appreciate that in this example, the call into the kernel whereas and the call returning from the kernel both need to be modified.

Figure 3:
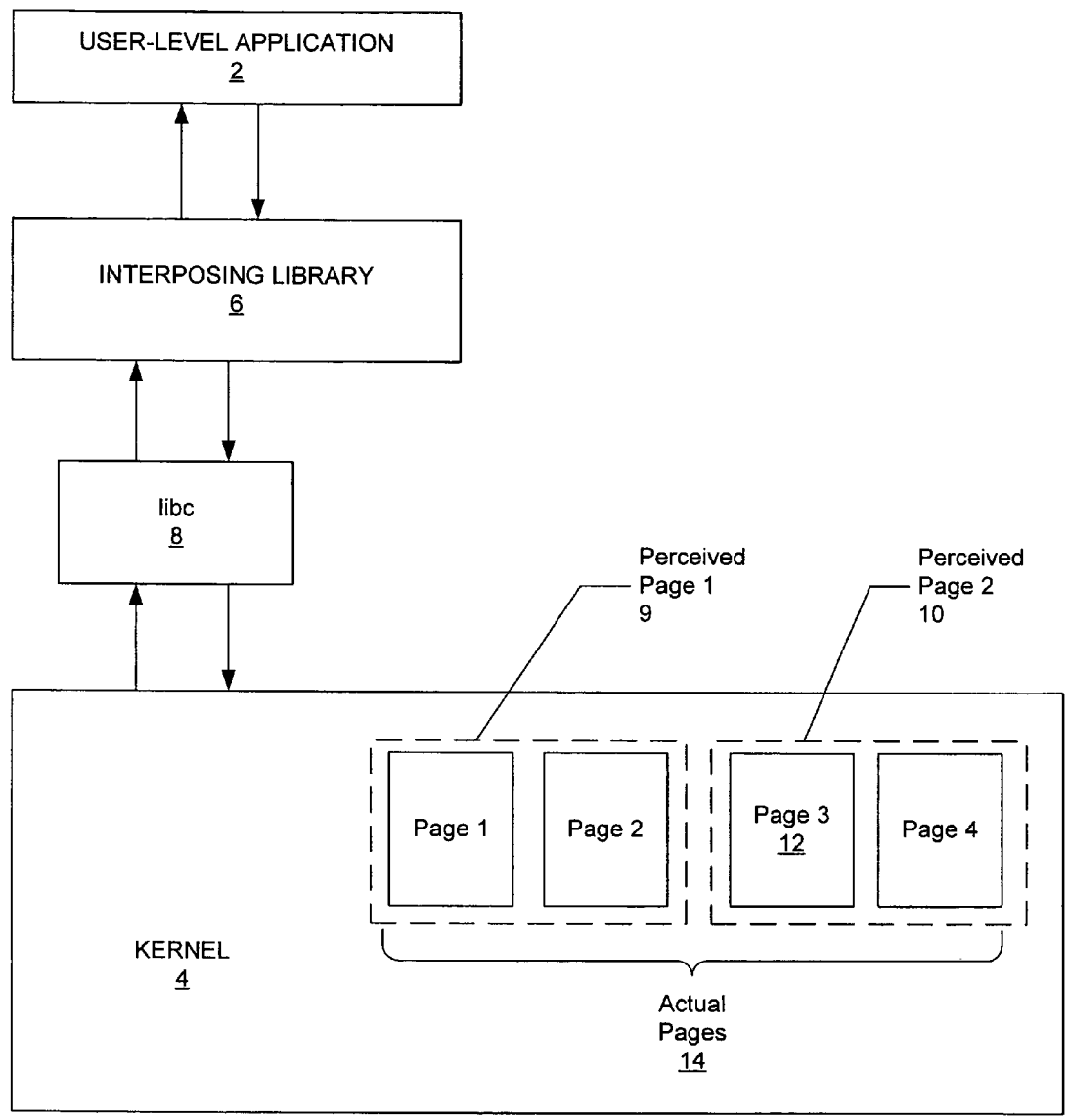
FIG. 3 illustrates a flow diagram in accordance with another embodiment of the invention.

In a third example, both the call into the kernel and the return call from the kernel need to be modified. FIG. 3 illustrates a third example of a system call made by a user-level application in accordance with one embodiment of the invention. Specifically, in this example, the native page size is 2K and the non-native page size is 4K. Thus, when a user-level application (2) calls into the kernel to receive the address of perceived page 2 (10) (i.e., the page emulated to the user-level application based on a 4K page size) the interposing library (6) intercepts the call.

At this stage, the interposing library (6) modifies the arguments of the call to request the address of actual page 3 (12) in memory. This is because the user-level application (2) is running on an alternate (i.e., non-native) page size that is double the size of the native page size. In other words, the size of each page according to the kernel (4) is half the size of each page according to the user-level application (2). However, both the perceived pages (9,10) and actual pages (14) cover the same amount of memory space. Thus, the address is the same for both actual page 3 (12) and perceived page 2 (10). Accordingly, the address of perceived page 2 (10) requested by the user-level application is in effect the address of actual page 3 (12), according to the native page size in the kernel (4). In one embodiment, the modified call is subsequently forwarded to libc (8), which subsequently forwards the modified call to the kernel (4).

The kernel (4) subsequently returns the address of actual page 3 to user-level application. The interposing library (6) intercepts the result again to modify the arguments returned by the kernel (4) to reflect the alternate page size. The interposing library (6) modifies the result to indicate that the address corresponds to perceived page 2. The modified result is then forwarded to the user-level application (2).

Embodiments of the invention provide a means to determine page size dependency of user-level applications. Specifically, by emulating a non-native page size using embodiments of the invention, a user can identify which user-level applications cease to function correctly when the non-native page size is emulated. In this manner, the user can efficiently determine which user-level applications are dependent on the native page size without any modifications to the native page size in the kernel.

Figure 4:
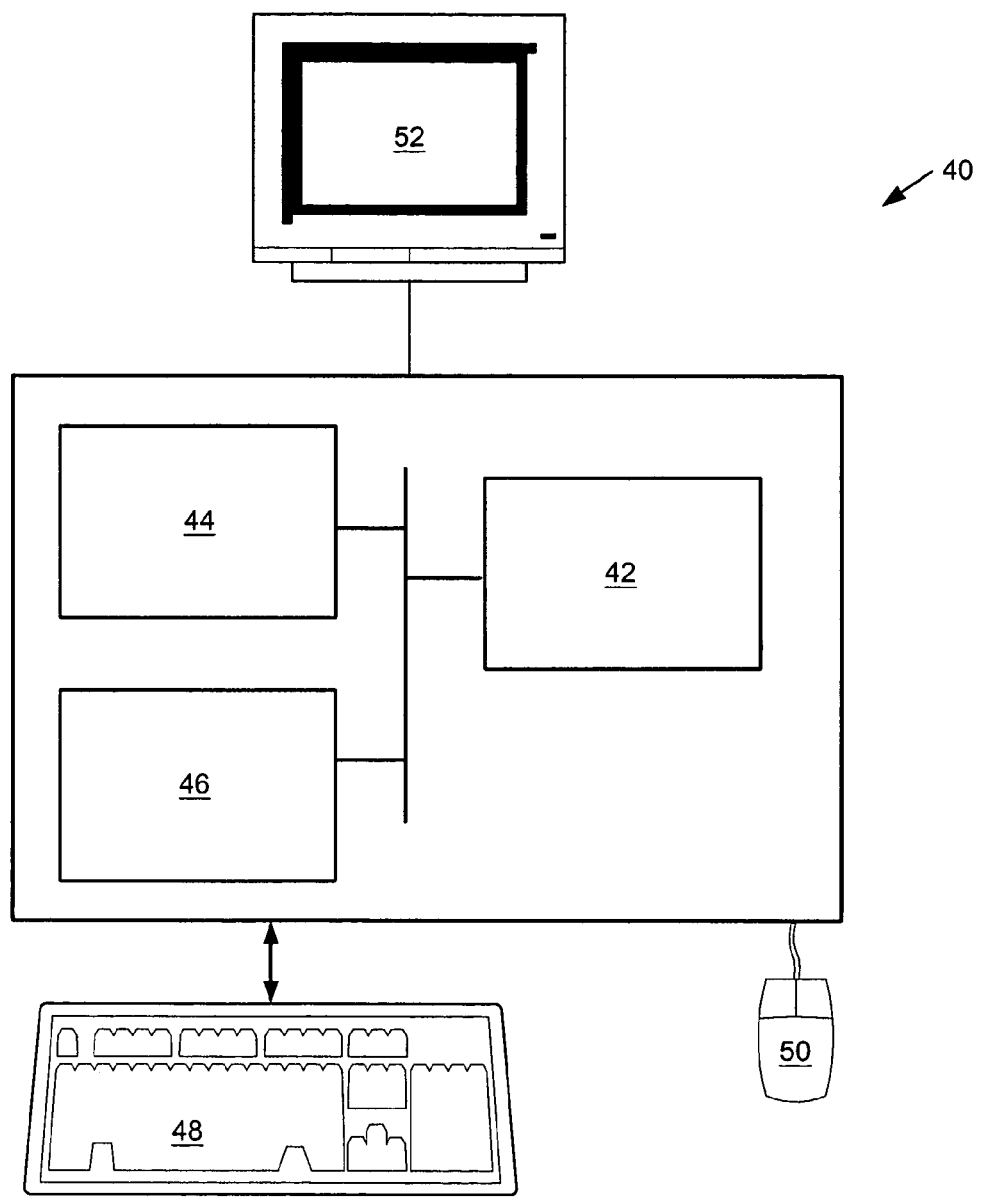
FIG. 4 illustrates a computer system in accordance with one embodiment of the invention.

The invention may be implemented on virtually any type of computer regardless of the platform being used. For example, as shown in FIG. 4, a networked computer system (40) includes a processor (42), associated memory (44), a storage device (46), and numerous other elements and functionalities typical of today's computers (not shown). The networked computer (40) may also include input means, such as a keyboard (48) and a mouse (50), and output means, such as a monitor (52). The networked computer system (40) is connected to a local area network (LAN) or a wide area network (e.g., the Internet) (not shown) via a network interface connection (not shown). Those skilled in the art will appreciate that these input and output means may take other forms. Further, those skilled in the art will appreciate that one or more elements of the aforementioned computer (40) may be located at a remote location and connected to the other elements over a network.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for processing a call comprising:
setting a non-native page size in an interposing library, wherein the interposing library is located in a user-level of a system and wherein the interposing library is located between a user-level application and a kernel, wherein the interposing library is generated by:
searching a plurality of interfaces to determine which of the plurality of interfaces include the native page size; and
modifying the plurality of interfaces that include the native page size to obtain a plurality of modified interfaces, wherein modifying the plurality of interfaces uses the non-native page size;
intercepting the call into the kernel by the interposing library, wherein the call is issued by the user-level application, wherein the call is dependent on the non-native page size and wherein the kernel uses a native page size;
modifying the call by the interposing library using a modified interface to obtain a modified call, wherein the modified call is dependent on the native page size, wherein the modified interface is one of the plurality of modified interfaces;
sending the modified call to the kernel;
generating a response to the modified call by the kernel using the native page size, wherein the response is dependent on the native page size;
sending the response to the user-level application;
intercepting the response by the interposing library;
modifying the response to obtain a modified response, wherein the modified response is dependent on the non-native page size; and
sending the modified response to the user-level application.

2. A system for checking page size dependency comprising:
a processor;
a kernel, located in a kernel-level of the system and executed on the processor, using a native page size;
a user-level application located in a user-level of the system; and
an interposing library located in the user-level configured to set a non-native page size to emulate and emulate the non-native page size to the user-level application, wherein the interposing library emulates the non-native page size by modifying results from the kernel based on the non-native page size, wherein the results from the kernel are based on the native page size, wherein the interposing library is further configured to modify a call dependent on the non-native page size from the user-level application to a call dependent on the native page size for the kernel, wherein the interposing library comprises a plurality of modified interfaces for emulating the non-native page size, wherein the plurality of modified interfaces are generated by searching a plurality of interfaces to determine which of the plurality of interfaces are dependent on the native page size and modifying the plurality of interfaces that include the native page size to obtain a plurality of modified interfaces.

3. The system of claim 1, wherein the interposing library uses a modified interface to emulate the non-native page size to the user-level application.

4. The system of claim 1, wherein the interposing library uses a modified interface to emulate the native page size to the kernel.

5. A computer system for checking page size dependency, comprising:
a processor;
a memory;
a storage device;
a computer display; and
software instructions stored in the memory for enabling the computer system under control of the processor, to:
set a non-native page size in an interposing library, wherein the interposing library is located in a user-level of a system and wherein the interposing library is located between a user-level application and a kernel, wherein the interposing library is generated by:
searching a plurality of interfaces to determine which of the plurality of interfaces are dependent on the native page size; and
modifying the plurality of interfaces that are dependent on the native page size to obtain a plurality of modified interfaces wherein modifying the plurality of interfaces uses the non-native page size;
intercept the call into the kernel by the interposing library, wherein the call is issued by the user-level application, wherein the call is dependent on the non-native page size and wherein the kernel uses a native page size;
modify the call by the interposing library using a modified interface to obtain a modified call, wherein the modified call is dependent on the native page size, wherein the modified interface is one of the plurality of modified interfaces;
send the modified call to the kernel;
generate a response to the modified call by the kernel using the native page size, wherein the response is dependent on the native page size;
send the response to the user-level application;
intercept the response by the interposing library;

modify the response to obtain a modified response, wherein the modified response is dependent on the non-native page size; and send the modified response to the user-level application.

6. A network system having a plurality of nodes, comprising:

a processor;

a kernel, located in a kernel-level of the network system and executed on the processor, using a native page size;

a user-level application located in a user-level of the network system; and an interposing library located in the user-level configured to set a non-native page size to emulate and emulate the non-native page size to the user-level application, wherein the interposing library emulates the non-native page size by modifying results from the kernel based on the non-native page size, wherein the results from the kernel are based on the native page size, wherein the interposing library is further configured to modify a call dependent on the non-native page size from the user-level application to a call dependent on the native page size for the kernel, wherein the interposing library comprises a plurality of modified interfaces for emulating the non-native page size, wherein the plurality of modified interfaces are generated by searching a plurality of interfaces to determine which of the plurality of interfaces are dependent on the native page size and modifying the plurality of interfaces that include the native page size to obtain a plurality of modified interfaces, wherein the kernel executes on any node of the plurality of nodes, wherein the user-level application executes on any node of the plurality of nodes, wherein the interposing library executes on any node of the plurality of nodes.

* * * * *

UNITED STATES PATENT AND TRADEMARK OFFICE
CERTIFICATE OF CORRECTION

PATENT NO. : 7,434,210 B1  
APPLICATION NO. : 10/791023  
DATED : October 7, 2008  
INVENTOR(S) : Andrew G. Tucker It is certified that error appears in the above-identified patent and that said Letters Patent is hereby corrected as shown below:

In Claim 3, column 8, line 26, "claim 1" should be --claim 2--.

In Claim 4, column 8, line 29, "claim 1" should be --claim 2--.

Signed and Sealed this

Twenty-third Day of December, 2008

JON W. DUDAS  
*Director of the United States Patent and Trademark Office*